July 9, 1963

E. SOSOLIC 3,096,888

DISTRIBUTOR DEVICE

Filed Nov. 24, 1958

INVENTOR.
ERNEST SOSOLIC

BY

Nolte and Nolte

ATTORNEYS

July 9, 1963

E. SOSOLIC 3,096,888

DISTRIBUTOR DEVICE

Filed Nov. 24, 1958

INVENTOR.
ERNEST SOSOLIC

BY
Nolte and Nolte

ATTORNEYS

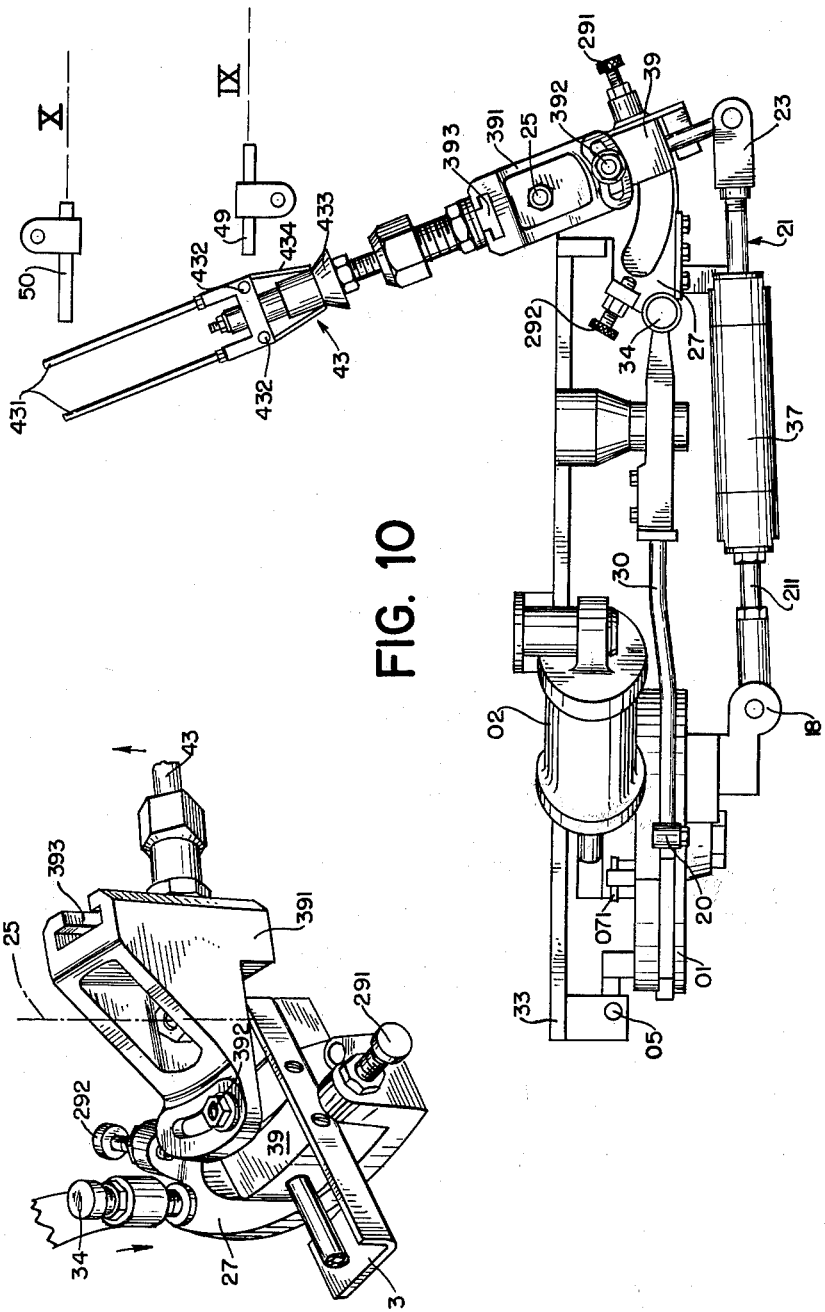

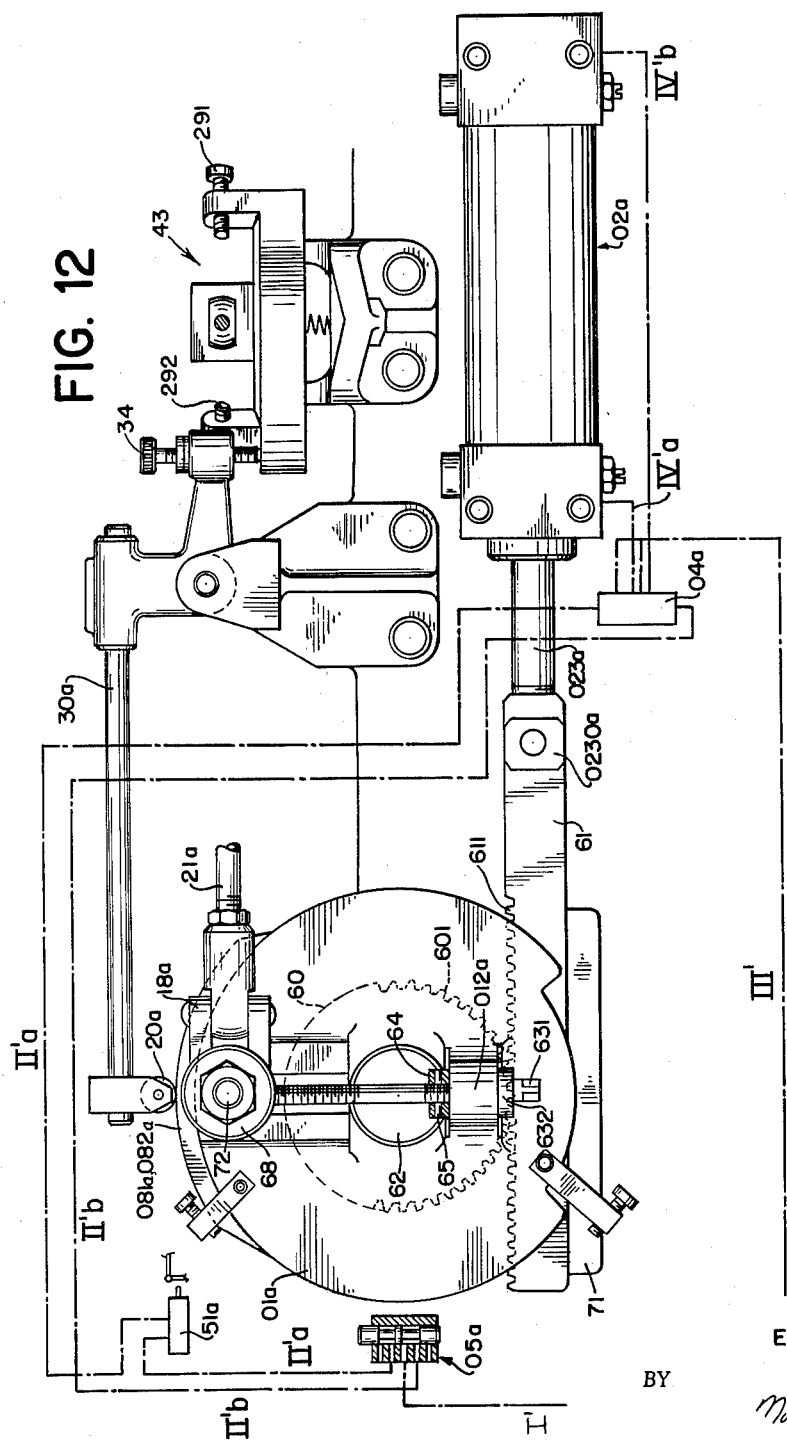

July 9, 1963  E. SOSOLIC  3,096,888
DISTRIBUTOR DEVICE
Filed Nov. 24, 1958  11 Sheets-Sheet 8

INVENTOR.
ERNEST SOSOLIC
BY
Nolte and Nolte
ATTORNEYS

July 9, 1963 E. SOSOLIC 3,096,888
DISTRIBUTOR DEVICE
Filed Nov. 24, 1958 11 Sheets-Sheet 9

INVENTOR.
ERNEST SOSOLIC
BY
*Nolte and Nolte*
ATTORNEYS

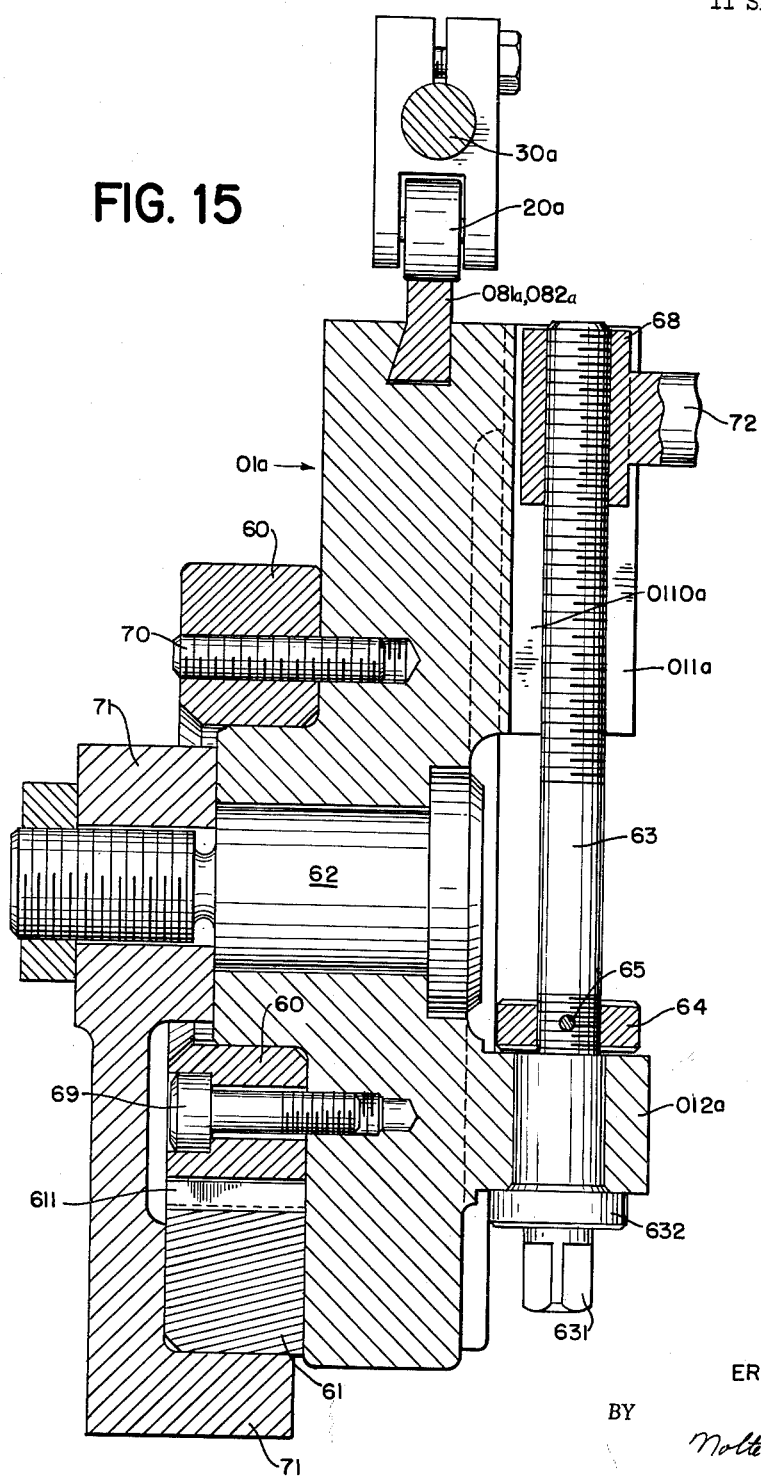

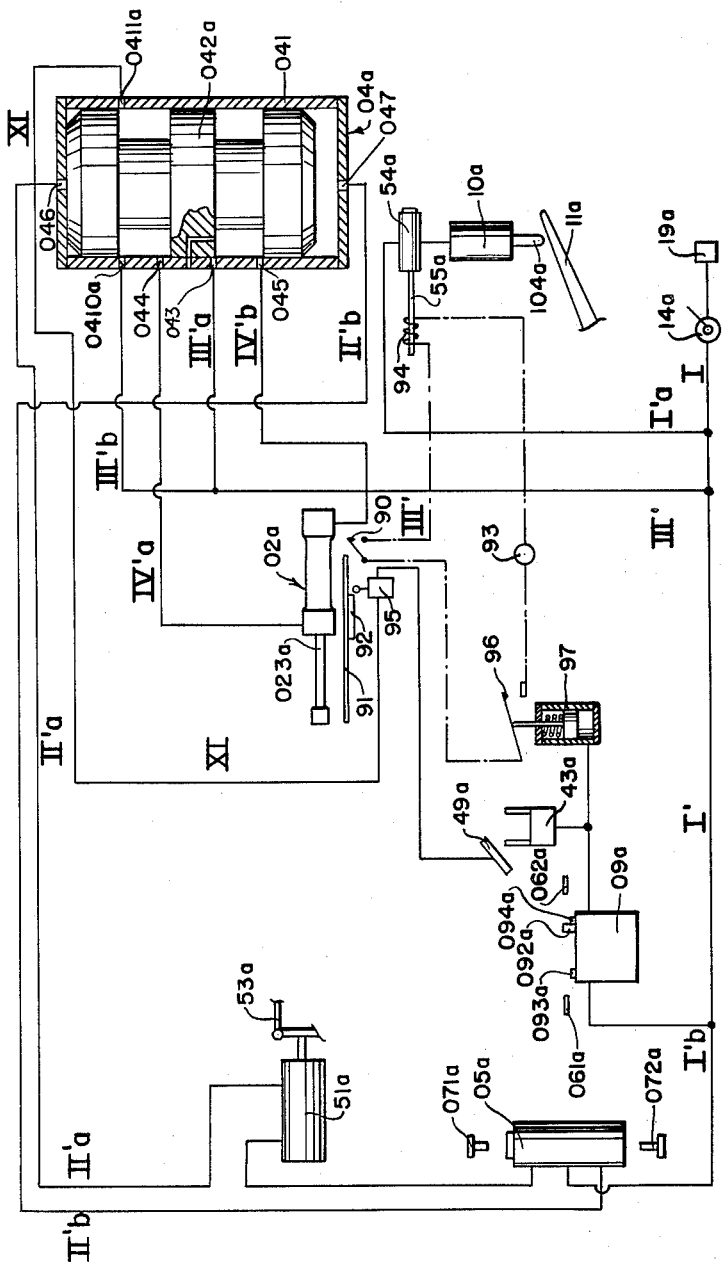

United States Patent Office 3,096,888
Patented July 9, 1963

3,096,888
DISTRIBUTOR DEVICE
Ernest Sosolic, Ornans, France, assignor to Societe Ornanaise de Constructions Mecaniques (S.O.C.), Ornans, France
Filed Nov. 24, 1958, Ser. No. 776,017
Claims priority, application France Nov. 30, 1957
4 Claims. (Cl. 214—1)

Devices for distributing workpieces are already known in which the working of the distributor device itself is dependent upon the working of the utilizing machine, the distributor itself controlling the displacement of the workpieces. The dependence of the distributor device upon the utilizing machine has the disadvantage of a loss of power of the latter. Actually, a machine devised to give its power at a given rate must be modified for adapting this rate to the slower rate of the distributor itself, and on this account, loses part of its power.

The present invention has the purpose of making the operation of the utilizing machine dependent on the working of the distributor device.

The invention also has the object of providing a distributor device comprising gripping means for conveying workpieces from a storage point to the utilizing machine.

The invention also has the object of providing means enabling displacements of the gripping means of the distributor to be obtained in both the horizontal and the vertical planes.

The invention also seeks to make regular the displacements of the gripping means by damping the ends of the strokes of said displacements.

A distributor device enabling the aforementioned objects to be achieved possesses the characteristics set forth in detail in the description which follows, and more particularly from the attached claims.

A distributor device according to the invention is shown by way of two non-restrictive examples in the attached drawings, in which:

FIG. 10 is a top view of the distributor device;

FIG. 11 is a partial perspective view of FIG. 10 showing the vertical displacements of the gripping device;

FIG. 12 is a partial front view of a second form of embodiment of a distributor device according to the invention;

FIG. 15 is a partial left-hand sectional view of FIG. 12;

FIG. 16 is a schematic illustration of the fluid circuit of the distributor device of FIG. 12, somewhat similar to FIG. 8, with the electric circuit of an electro-valve shown by dot-and-dash lines;

According to the invention, the distributor device controls the action of the utilizing machine and acts on the displacement of the workpieces. The operation of the utilizing machine is thus dependent on the performance of the distributor device.

Figure 1:
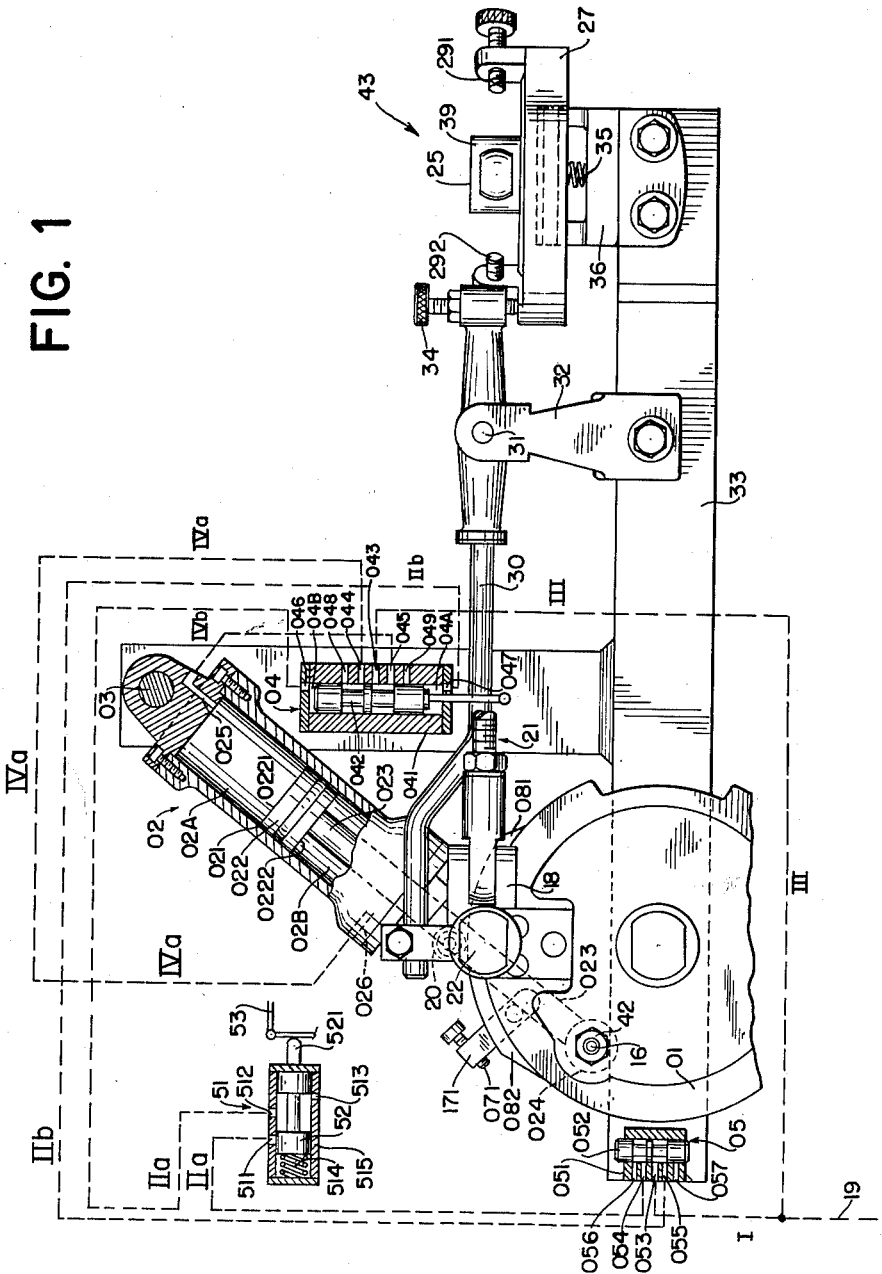
FIG. 1 is a partial front view of a distributor device according to the invention.
Figure 2:
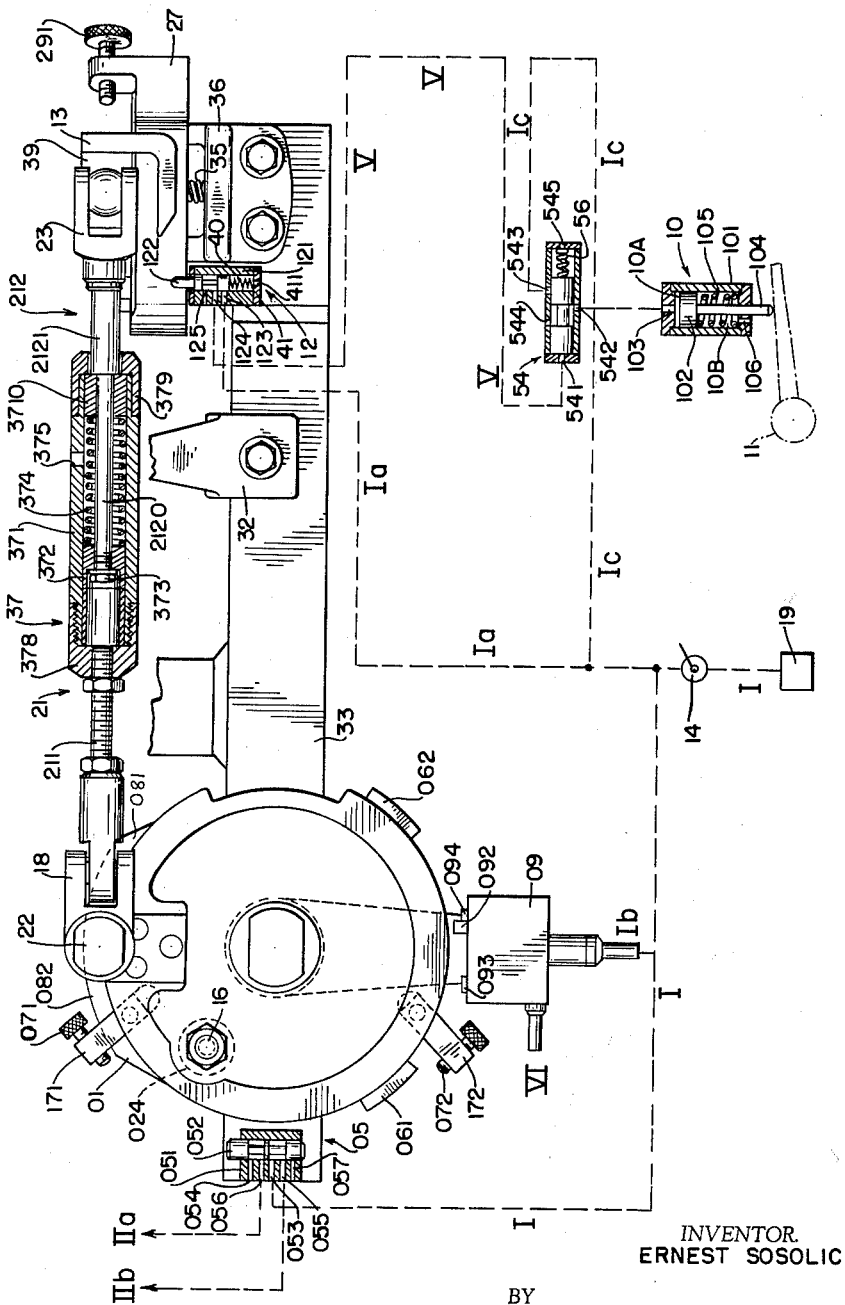
FIG. 2 is another partial front view of the distributor device shown in FIG. 1.

Also according to the invention, the embodiment of the device for distributing workpieces shown in FIGS. 1, 2 and 10 essentially comprises a gripping means such as jaws whose movement is controlled: (a) for the vertical movement of a gripping device 43, by means of a lever 30; and (b) for displacements in the horizontal plane, by means of a connecting rod 21.

The means enabling a displacement in the horizontal plane are controlled by the intermediary of a distributor plate 01 which can oscillate on its spindle.

The oscillatory displacements of the distributor plate 01 are controlled by a jack 02 which is itself controlled by a pressure fluid distributor.

The control jack 02 (FIG. 1) is articulated at its top part around a spindle 03 and is connected with the distributor plate 01 through a piston rod 023.

The control jack 02 comprises a cylinder 021 in which moves a piston 022 whose rod 023 has an eyelet 024 at its free end cooperating with a crank-pin 16 fixed to the distributor plate 01. The piston rod 023 is held against the plate 01 by means of a nut 42 fitted to the threaded end of the crank-pin 16. The displacement of the piston 022 is ensured by a fluid under pressure, the admission of which to one or the other face 0221 and 0222, respectively, of the piston 022 is controlled by (a) a pilot valve 05, (b) a distribution block 04 and (c) a control valve unit 51.

*Pilot valve 05.*—The fluid under pressure arriving by way of a fluid intake 19 enters the pilot valve 05 through a feed piping I and the opening 053. At this stage of the flow of the fluid toward the jack 02, according to the position of a piston 052 in a body 051 of the pilot valve 05, the fluid will flow toward the distribution block 04 either through an opening 054 or an opening 055.

When the piston 052 of the pilot valve 05 is in the top position, the opening 054 for the passage of the fluid toward the distribution block 04 communicates with an exhaust opening 056 and the opening 053 for the intake of fluid under pressure is connected to the opening 055 for the output of the fluid toward the distribution block 04.

The fluid coming from the intake 19 (FIG. 8) thus enters the valve 05 through the opening 053 and emerges from said valve through the opening 055 along a pipe II*b*, thus arriving at the distribution block 04 through an intake opening 047.

When the piston 052 is in the low position, the fluid intake opening 053 is in communication with the output opening 054 toward the distribution block 04, and the output opening 055 communicates with an exhaust opening 057. The slide-valve 052 of the pilot valve 05 then moves in the casing 051 according to the action to which it is subjected by one or the other of abutments 071 and 072 fixed to the distributor plate 01 by means of intermediate parts 171 and 172.

Preferably, as shown more particularly in FIGS. 1 and 2 of the attached drawings, the abutments 071 and 072 are formed by screws adjustable on the intermediate parts 171 and 172.

*Distribution block 04.*—The fluid under pressure admitted by the pilot valve 05 reaches the distribution block 04 directly through one of the two output openings 054 or 055, the connection of one of these openings to the distribution block being provided with adjustment means such as the control valve unit 51 which will be described further on.

The fluid under pressure coming from the pilot valve 05 via the control unit 51 reaches the distribution block 04 through an opening 046. Piston 042 which was previously in casing 041 in its top position is thus displaced downward, and in this latter position, puts the following openings into communication: an opening 043 is connected to the general fluid intake by a circuit III branched to the feed circuit I before the pilot valve 05, with an opening 044 connected by IVa to the jack 02; an opening 045 is connected to the jack 02 with an exhaust opening 049.

During the descent of the piston 042 of the distribution block 04, the fluid contained in a chamber 04A is conveyed to the pilot valve 05 by the circuit IIb which, leading to the opening 055, allows the fluid to pass to the exhaust through the opening 057, the piston 052 then being in the bottom position, similarly to the piston 042.

When the piston 042 of the distribution block 04 has been returned from the bottom position to its top position, the openings of the distribution block 04 communicate in the following manner: the fluid intake opening 043 is in connection with the fluid output opening 045 toward the jack 02 by a circuit IVb and the second output opening 044 to the jack 02 with an exhaust opening 048.

Similarly to the foregoing, when the piston moves from its bottom position to its top position, the volume of fluid contained in a chamber 04B is returned toward the pilot valve 05 through the opening 046, and a circuit IIa is discharged through the exhaust opening 056.

*Control valve unit 51.*—A control unit 51 is mounted in one of the circuits IIa or IIb for the purpose of admitting or blocking the fluid passage of the pilot valve 05 or the distribution block 04. The control unit 51 is shown mounted in the circuit IIa in FIGS. 1 and 8. The fluid admitted by the opening 054 of the pilot valve 05 toward the distribution block 04 (the slide-valve member 052 being in its bottom position) enters through an opening 511 into the bore of the control unit 51 defined by walls 515; in this case, two positions of a slide-valve 52 must be considered:

In the first position, a pedal 53 pushes a stem 521 of the slide-vale 52, the fluid under pressure passes from opening 511 into an opening 512 and enters the distribution block 04 by opening 046 (in this position, the slide-valve 52 closes an exhaust opening 513).

In the second position, the pedal 53 does not act on the stem 521. The slide-valve 52, under the influence of a spring 514, is urged back so as to close the fluid intake opening 511 of the control valve 05 and connect the opening 512 with the exhaust opening 513.

The control unit 51, in the first of the positions of its slide-valve 52, thus admits the fluid under pressure from the pilot valve 05 into the distribution block 04 and, in the second of the postions of the slide-valve 52, interrupts the admission of fluid into the distribution block 04.

*Jack 02.*—When the fluid under pressure enters the jack 02 through an opening 025 connected by line IVb to the distribution block 04, said fluid acts on the face 0221 of the piston 022 which is pushed downward within the jack 02.

The fluid then contained in the chamber 02B is evacuated through an opening 026, the circuit IVa and the opening 044 of the distribution block 04, said opening being at that moment in communication with the exhaust opening 048.

When the fluid is admitted into the jack 02 through the intake opening 026 connected by IVa to the distribution block 04, it acts on the other face 0222 of the piston and causes the latter to move upward.

The volume of fluid in a chamber 02A is thus evacuated toward the distribution block 04 through the opening 025 of the jack 02, the piping IVb and the opening 045 of the distribution block 04 which latter is then in communication with the exhaust opening 049.

The relation of these various members to the gripping means 43 is more especially shown in FIG. 10.

OPENING AND CLOSING THE GRIPPING DEVICE

The feeding arm oscillating about axis 25 has on its free end two co-operating gripping members or jaws 431 each pivoted at 432 on a head carried by the arm. The rear ends of the jaws 431 are adapted to be engaged by a cone or wedge 433 which is axially movable to cause the jaws to grip or release a workpiece by an actuator 434 to which compressed air is fed by a flexible pipe not shown in the drawings.

The control of the opening and closing of the gripping means 43 is effected by a valve 09. This valve, having the structure of a conventional cock or tap, is connected by a pipe Ib to the feed pipe I of the fluid under pressure (compressed air, for instance). The gripping means 43 is connected to the valve 09 by a pipe VI and the fluid output admitted into the valve 09 by pipe Ib is controlled by a finger 092 moving between two abutments 093 and 094 under the influence of one or the other projecting member 061 and 062 fixed to the distributor plate 01.

The opening of the gripping means 43 (FIG. 5 having a solid line for the outward cycle and a dashed line for the return cycle) is thus effected by the projecting member 062, and the closing by the projecting member 061.

The displacements of the gripping means 43 are regulated in the following cycles schematically shown in FIG. 9.

The "outward cycle" of the gripping means 43 comprises: picking up a workpiece from a distribution table 45; vertical displacement of the gripping means 43 together with the workpiece in the direction denoted "A"; displacement in the horizontal plane as shown at "B"; vertical movement as shown at "C"; and finally depositing the conveyed workpiece on a work table 44.

The "return cycle" of the gripping means 43 comprises: after depositing the workpiece on the work table 44, vertical movement of the gripping means 43 as shown at "D"; movement in the horizontal plane in the direction shown at "E"; and finally displacement of the gripping means in the vertical plane in the direction "F" so as to bring said gripping means back to the distribution table 45.

The various movements of the gripping means 43 in the cycles examined above are effected by means of: (*a*) the lever 30, effecting the vertical displacement of gripping; and (*b*) the connecting rod 21, effecting the displacement of the gripping means 43 in the horizontal plane.

Hereafter, a description is given of the various stopping positions of the gripping means 43 both at the distribution table 45 and the work table 44.

DISPLACEMENT OF THE GRIPPING DEVICE IN THE VERTICAL PLANE (FIG. 4)

Figure 4:
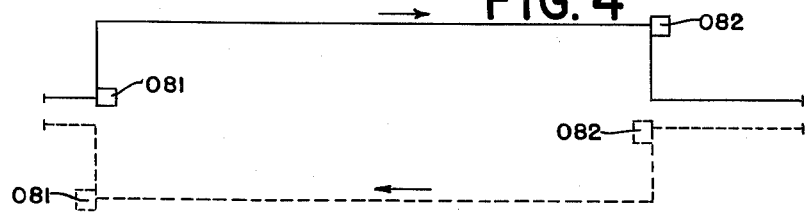
FIG. 4 is a schematic view similar to FIG. 3 but in the vertical plane.

As shown in FIGS. 1 and 11, the angular movement of a movable part 27 (see FIG. 4 in which the solid line denotes the outward cycle while the dashed line indicates the return cycle) is effected by the lever 30 pivotally mounted about a horizontal pin 31 in lugs on a bracket 32 fixed to a frame 33. The front end of the lever 30 carries a vertically adjustable stud or tappet 34 bearing on the movable part 27 while the other end of the lever 30 has clamped to it a split block in which is mounted a roller 20 cooperating with a cam formed by two parts 081 and 082 mounted in the edge of the distributor plate or disc 01. The cam 081, 082 is preferably formed by an arcuate member clamped in a slot in the disc so that it can be angularly adjusted on said disc. The cam, through the lever 30, moves the part 27 in one direction while the return movement is effected by a spring 35 arranged between the part 27 and another part 36 integral with the frame 33.

As shown particularly in FIG. 11, a flanged casting 391 is mounted on a movable part 39 hingedly connected to rod 21 by means of a vertical clamping stud 392 passing through an arcuate slot provided in the casting 391. The assembly constituted by the casting 391 and the part 39 are pivotally mounted on the movable part 27 by means of a vertical stud about the axis 25 of which said assembly oscillates when the rod 21 is reciprocated. A T-groove 393 in the front end of the casting 391 receives a complementary member on the rear end of the arm carrying at its free end the two co-operating members or jaws 431 pivoted at 432 on a head carried by the feeding arm.

The operation of the device described above is easy to understand: the two cam portions 081 and 082 ensure the rising of the gripping means 43 in the outward cycle of displacements as examined above and the downward movement of said gripping means in the return cycle, respectively, as well as the downward movement of the gripping means in the outward cycle of displacements and the rising of said gripping means in the return cycle.

Thus, when the distributor plate 01 is moving under the action of the rod 023 of the piston 022 of the jack 02, the roller 20 moving along the cam parts 081 and 082 causes the vertical movement of the gripping means 43, secured to the plate 39, which is itself mounted on the movable part 27. The action of the lever 30 on the movable part 27 is carried out by means of an adjustable screw 34 mounted at the end of said lever 30.

DISPLACEMENT OF THE GRIPPING DEVICE IN THE HORIZONTAL PLANE (FIG. 3)

Figure 3:
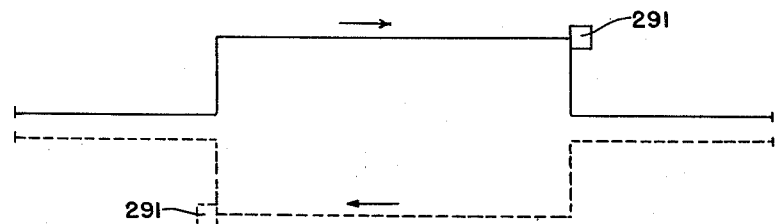
FIG. 3 is a schematic showing of the displacement of the gripping device in the horizontal plane.

The displacements are effected by means of the connecting rod 21. The rod 21 is fixed at one end to a yoke 18 integral with a pivot pin 22 of the distributor plate 01, and at its other end, by means of a yoke 23, to the plate 39 which is integral with the gripping means 43. In FIG. 3, the outward cycle is again shown with a solid line while the return cycle is shown with a dashed line. The connecting rod 21 is made of two sections, 211 and 212, with a damper 37 therebetween.

This damper essentially comprises a cylinder 371 with a plug 378 fitted to one end, said plug being integral with the rod section 211, and a plug 379 at the other end, in which a bore is made, allowing the passage of the rod section 212.

The latter part 212 of the connecting rod 21 comprises two portions 2120 and 2121 having different diameters. On portion 2120, two pistons 372 and 3710 are slidably mounted, these pistons moving freely in the cylinder 371 of the damper 37. At the end of the part 212 a nut 373 is fixed which co-operates with a stop washer, ensuring, by the displacement of the part 212, the sliding of the piston 372 inside the cylinder 371.

Between the two pistons 372 and 3710 sliding on the portion 2120 and inside the cylinder 371, a spring 374 is mounted which is stressed and tends to separate the pistons 372 and 3710 from each other.

The cylinder 371 also comprises a hole 375 opening in the housing of the spring 374 and ensuring communication of said housing with the open air.

The displacements of the gripping means 43 and the plate 39 integral with the former in the horizontal plane and around the vertical axis 25 are limited by the abutments 291 and 292 acting on the plate 39.

Thus, when the gripping means 43 are above the work table 44, the plate 39 is momentarily in contact with the abutment 291, and when the gripping means are above the distribution table 45, it is the abutment 292 which is in contact with said plate 39. The abutments 291 and 292 will be described subsequently.

During the displacement of the distributor plate 01, the connecting rod 21 is either pulled toward the left (FIG. 2) or pushed to the right and corresponds to the displacement of the gripping means from the work table 44 to the distribution table 45, and from the distribution table 45 to the work table 44, respectively.

During the normal transmission of movement of the distributor plate 01 (FIG. 6 with line indications as mentioned above for the similar FIGS. 3 to 5) to the gripping means 43, the damper 37 remains in the position shown in FIG. 2, i.e., the stressed spring 374 connects the cylinder 371 with the part 212.

When the plate 39 is in contact with one of the abutments 291 or 292, there occurs either a separation of the parts 211 and 212 of the connecting rod 21, or a pulling together of said parts. These two movements will be hereinafter examined in more detail:

SEPARATION OF PARTS 211 AND 212 OF CONNECTING ROD 21

The distributor plate 01 moving toward the left pulls the part 211, the plate 39 then being in contact with the abutment 292. In its movement to the left (FIG. 2), the part 211, integral with the plug 378 of the cylinder 371, displaces the piston 3710 sliding on the bearing 2120 of the part 212 through the plug 379 and compresses the spring 374 between the pistons 372 and 3710.

At this moment, the part 212 is at rest, the plate 39 being in contact with the abutment 292 while the piston 372 abuts the plug 378.

The plate 39 being in contact with the abutment 292, the last phase of the displacement of part 211 compresses the spring 374.

PULLING TOGETHER OF PARTS 211 AND 212 OF CONNECTING ROD 21

When the plate 01 performs its movement to the right (FIG. 2), the plate 39 coming into contact with the abutment 291, the part 212 comes to rest whereas the part 211 keeps on moving toward the right.

In this position, the part 211 acts on the piston 372 by means of the plug 378, thus compressing the spring 374 between the pistons 372 and 3710; the latter comes into contact with the internal portion of the plug 379 under the action of the spring 372. In this position, the spring 374 is again compressed.

As stated above, the displacement in the horizontal plane of the plate 39 is limited by the two abutments 291 and 292. These abutments (FIGS. 1 and 2) are integral with the movable part 27 and are preferably made in the shape of adjusting screws.

Figure 8:
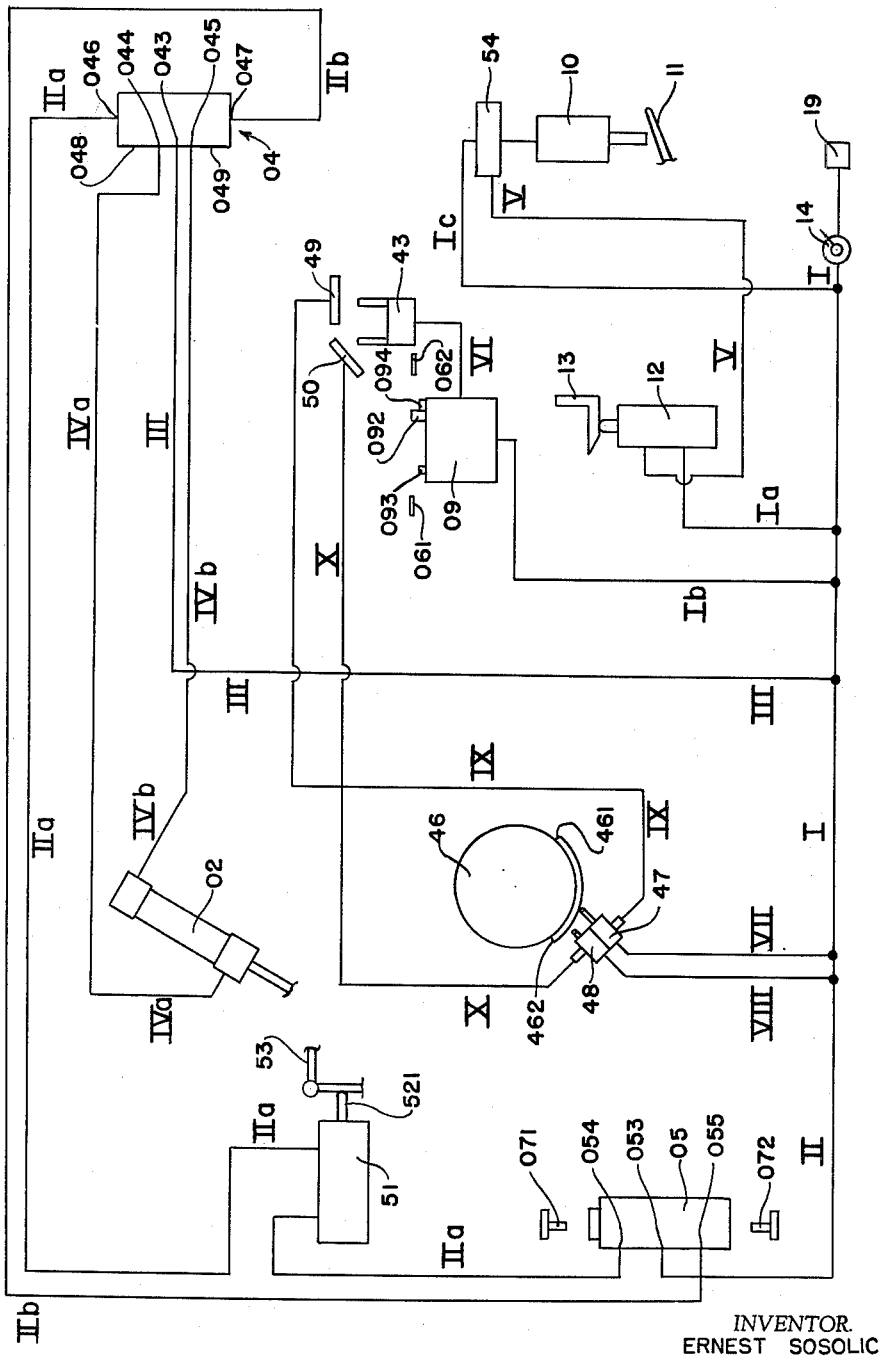
FIG. 8 is a schematic illustration of the fluid circuit of the distributor device.

The plate 39 is also provided with a cam 13 which, by action on means such as a valve 12 and a control jack 10, acts on a clutch device 11 of the utilizing machine. For this purpose, the cam 13, in a given position of the plate 39, and consequently of the gripping means 43, acts on a piston 122 of the valve 12, allowing the passage of the fluid from the distributor toward the control jack 10, acting on the clutch device 11 of the machine (FIG. 8).

The piston 122 moves in a casing 121 provided with three openings: (a) an exhaust opening 125; (b) an opening 124 connected by a piping V to the jack 10; and (c) an opening 123 connected to the general piping I by a pipe Ia. The piston 122 of the valve 12 may assume two positions:

In the first position, the cam 13 bears on the end of piston 122, so that said piston establishes communication between the intake openings 123 of the fluid under pressure and 124 of the output of the fluid toward the jack 10.

In this position, the piston 122 compresses means such as a spring 40, ensuring the rise of said piston when cam 13 no longer acts on same. Furthermore, the housing of the spring 40 communicates with the open air by means of an opening 411 formed in a base plate 41 of valve 12.

In the second position, the cam 13 clears the piston 122 under the influence of means such as a spring, the piston 122 rises, thus putting into communication the output openings 124 of the fluid under pressure toward the jack 10 and the exhaust opening 125.

Figure 7:
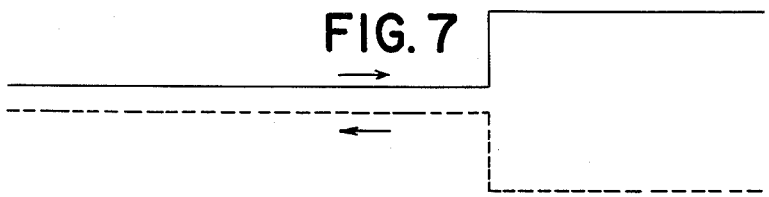
FIG. 7 is a schematic showing of the clutching movement of the operating machine.

The jack 10 comprises a casing 101 in which a piston 102 moves whose rod 104 acts on means such as a clutch lever 11 of the utilizing machine (FIG. 7 having solid and dashed lines for the outward and return strokes, respectively); the fluid under pressure enters into the jack 10 through an opening 103.

The jack 10 controlling the clutch 11 co-operates with a valve 54 for admitting the fluid to the jack 10. This valve comprises a casing in which a slide-valve member 55 moves.

The casing of the valve 54 comprises openings communicating with the bore of the slide-valve 55. The openings are the following: an opening 541 connected by pipe V to the opening 124 of valve 12; an opening 542 connected to the opening 103 for admitting fluid to the jack 10; an opening 543 connected by a pipe Ic to the general fluid intake pipe I through the valve 14; an exhaust opening 544; and an opening 545 to the open air.

The slide-valve member 55 of the valve 54 moves under the influence of the fluid reaching the valve 12. When the supply of fluid is interrupted, the slide-valve member 55 is pushed back to its initial position by a spring 56.

Two positions of the slide-valve member 55 have to be considered.

In the first position of slide-valve 55, the fluid coming from the valve 12 is admitted through the piping V into the valve 54 by means of the opening 541, and the slide-valve 55 is in the position in which the openings 542 and 543 are in communication (the bore containing a spring 56 being in communication with the open air through opening 545).

The fluid coming through pipe Ic from the general intake I thus passes through the valve 54 and enters a chamber 10A of the jack 10 through the opening 103. The piston 102 is pushed downward (FIG. 2) and the rod 104 moves the lever 11 controlling the clutch of the utilizing machine.

The downward movement of the piston 102 is opposed by a spring 105 which is compressed during the downward movement, at the same time the air contained in a chamber 10B of the jack 10 is discharged to the atmosphere through an opening 106.

In the second position of slide-valve 55, the admission of the fluid into the jack 10 ceases owing to the action of the valve 12, i.e., when the cam 13 clears the piston 122 which then rises, putting into communication the output openings 124 leading to the jack 10 and the opening 125 leading to the atmosphere, the slide valve 55 of the valve 54 being no longer urged by the fluid coming from the valve 12 through opening 541 of the valve 54, so that it moves under the action of spring 56, putting into communication the output opening 542 leading to the jack 10 with the exhaust opening 544. The piston 102 of the jack 10 then moves upward under the influence of the spring 105.

The rod 104 of the piston 102 then clears the clutch lever 11 of the utilizing machine, thus stopping said machine.

The fluid contained in the chamber 10A then passes through the opening 103 and, returning into the valve 54 through the opening 542, is discharged through the exhaust opening 544.

The distributor device according to the invention operates as follows:

*Position of the Parts*

After the admission of the fluid under pressure into the fluid circuit by the inlet 19 and opening of the valve 14, the gripping means 43 are closed and are located above the distribution table 45; the plate 39 is then in contact with the abutment 292; the finger 092 is in contact with the projecting member 061; and the valve 09 is closed. The feed piping of the gripping means 43 below the valve 09 is connected to the exhaust and the abutment 071 has pushed downwards the piston 052 of the pilot valve 05 (the fluid under pressure thus passes from I to IIa).

The crank-pin 22 is then at the end of its stroke and the spring 374 of the damper 37 is compressed.

The roller 20 terminating the lever 30 controlling the vertical displacement of the gripping means runs on the projecting part of the cam part 081 fixed to the distributor plate 01.

In this position, the distribution block 04 has received through IIa the fluid coming from the pilot valve 05 through the control unit 51 and the piston 042 of said distribution block is in the bottom position. The fluid thus passes through IVa into the jack 02 and acts on the face 0222 of the piston 022.

The openings 511 and 512 of the control unit 51 are in communication. The piston 022 which was formerly in the bottom position then rises under the influence of the fluid under pressure. The cam 13 fixed to the plate 39 carrying the gripping means 43 is on the piston 122 of the valve 12; the fluid is then admitted through the pipe Ia and the pipe V into the control jack 10.

The circulation of the fluid in the circuit of the distributor device is regulated by a valve 14 which is a main valve placed immediately after the fluid intake 19.

*Cycle of the Distributor Device*

When the fluid under pressure coming through IVa acts on the face 0222 of the piston 022 which moves upwards, the volume 02A is evacuated through IVb and the openings 045 and 049 of the distribution block 04. The piston 022, while moving, acts on the rod 023 which controls the displacement of the distributor plate 01 by means of a crank-pin 16. As soon as the piston 022 moves, it causes the displacement of the plate 01 and the spring 374 of the damper 37, insofar as the gripping means move in the horizontal plane. The gripping means 43 are, however, subjected in the vertical plane to a movement due to the action of the cam 081 raising the roller 20 fixed to the lever 30. The gripping means 43 fixed to the plate 39 rise (movement "A" in FIG. 9).

Figure 9:
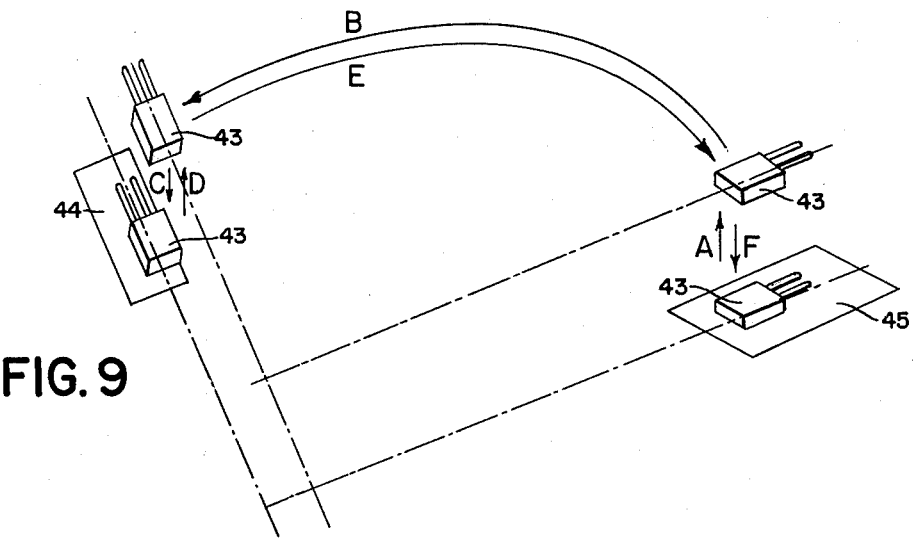
FIG. 9 is a schematic perspective view of the spatial displacement of the gripping device.

Then the spring 374 is in its position of equilibrium and the gripping means 43 are raised and move in the horizontal plane of the distribution table 45 and of the work table 44 (movement "B" in FIG. 9). The cam 13 is then leaving the end of the piston 122, according to a displacement of the gripping means 43 in the horizontal plane, and closes the fluid passage from Ia to V. The gripping means 43 continue to move until the plate 39 contacts the abutment 291. They are then above the work table 44; their displacement in the horizontal plane is interrupted.

Figure 5:
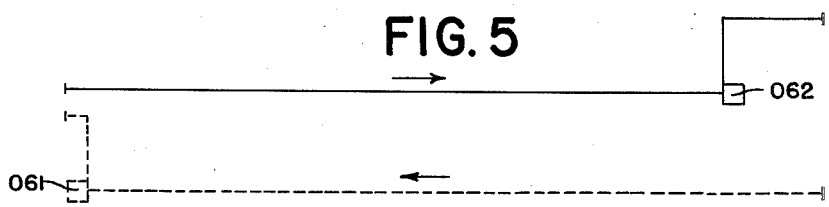
FIG. 5 is a schematic showing of the opening movement of the gripping device.
Figure 6:
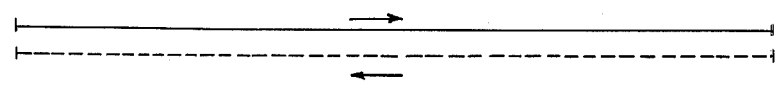
FIG. 6 is still another schematic view of the displacement of the center point of the articulation 22 on the distributor plate 01.

The piston 022 then continues its upward stroke while carrying along the distributor plate 01, and the spring 374 of the damper 37 is compressed. The gripping means 43 following the movement of the plate 39 and the movable part 27 move in a vertical plane according to a movement controlled by the lever 30 whose roller 20 clears the cam 082. The projecting member 062 integral with the distributor plate 01 acts on the finger 092 and closes the fluid intake circuit to the gripping means 43 while connecting the intake piping VI of the gripping means 43 to the exhaust. The gripping means 43 then open (FIG. 5).

The distributor plate 01 continues its movement under the action of the rod 023 and the abutment 072 of the distributor plate 01 pushes the piston 052 upwards. The displacement of the piston 052 involves, through the control of the fluid by IIb, the upward displacement of the piston 042. This movement causes the intake of the fluid to act on the face 0221. The volume 02B of the jack 02 passes to the exhaust through IVa and the openings 044 and 048 of the distribution block 04.

There is then a reversal of the movement of the piston 022 which will thus move downward; it results therefrom that the spring 374 is restored to its position of equilibrium; the roller 20 fixed to the lever 30 is raised while rolling on the cam 082; the gripping means 43 rises in the vertical plane; the gripping means 43, under the action of the connecting rod 21, move in the horizontal plane to return to the distribution table 45; the part 39 coming into contact with the abutment 292 is stopped in this position and the spring 374 is compressed. The roller 20 is now released from the cam 081 with which it has been in engagement and the lever 30 lowers the gripping means 43 to the distribution table 45. Since the distributor plate 01 continues its movement in this position, the projecting member 061 comes into contact with the finger 092 and thus the gripping means 43 close.

The abutment 071 continuing its movement with the distribution plate 01, it then encounters the piston 052 and causes it to descend, causing the downward stroke of piston 042 and consequently the admission of the pressure fluid to the face 0222 of piston 022. At this moment, there is a reversal of movement, the piston 022 will thus rise, the situation being then the same as described hereinabove.

The circuit of the fluid under pressure controlling the action of the distributor device described above is more especially shown in FIG. 8.

Moreover, there is shown in this FIG. 8: (a) a device 49 for blowing workpieces; and (b) a device 50 for workpiece ejection. These two devices essentially comprise a control plate 46 on which are distributed cams 461 and 462 which co-operate with the rollers which control the opening and closing of valves 47 and 48 allowing or preventing, respectively, the admission of the fluid to the blowing device 49 and to the ejection device 50.

The fluid arriving by pipes VII and VIII enters the valves 47 and 48 where, depending on the positions of the rollers on the cams 461 and 462, the fluid passes or does not pass through pipe IX and X towards the aforementioned devices 49 and 50.

The plate 46 on which the cams 461 and 462 are mounted is preferably connected to the driving shaft of the utilizing machine.

A second form of embodiment according to the invention is shown in FIGS. 12 to 18. Parts that are substantially the same as in the first embodiment described hereinabove will be denoted by identical numerals with subscripts "a" while pipe connections will be denoted by the same Roman numerals with primes added, when substantially alike.

According to this second form of embodiment, the distributor device is provided with a control jack 02a comprising a casing wherein a piston 022a moves integral with a rod 023a. The rod 023a is shaped at its free end in the form of a yoke 0230a which receives the end of a rack 61 the teeth 611 of which co-operate with a pinion 60 fixed to a distributor plate 01a.

Figure 14:
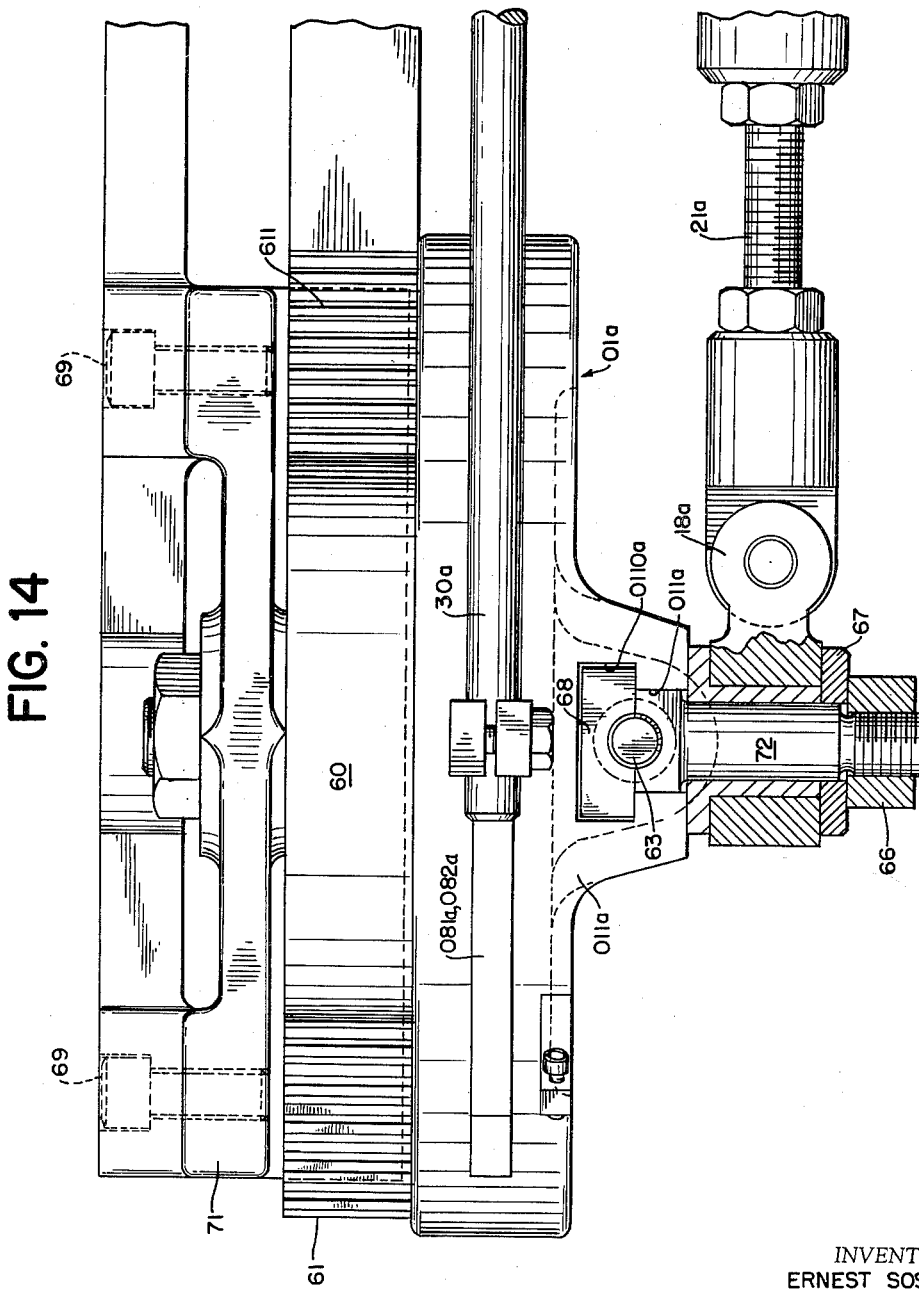
FIG. 14 is a partial top view of FIG. 12.

Preferably, as shown in FIGS. 12, 14 and 15, the pinion 60 is provided with teeth 601 on a little more than about half of its periphery only. The pinion 60 can be fixed to the plate 01a by any means, such as bolts 69 and pins 70.

Moreover, the rack 61 is subjected to a reciprocating movement controlled by the jack 02a and is guided during its movements by a guiding part 71. This guiding part is preferably fixed to a spindle 62 of the distributor plate 01a, around which said plate oscillates. The guiding part 71 has an L-shaped section on the lower branch of which the rack 61 rests.

Thus, at each movement of the rod 023a of the control jack 02a, the rack 61 moves on the guiding part 71 and causes the plate 01a to oscillate.

As shown in FIGS. 12, 14 and 15, the connecting rod 21a is mounted on the plate 01a by means of an adjustable device which allows the position of the connecting rod 21a to be varied with respect to the axis of the plate 01a, and consequently, both the stroke and the travel of the gripping means.

A gripping means 43a is vertically adjustable by means of a lever 30a in a manner similar to that discussed in connection with the first embodiment. A roller 20a is provided in the split block attached to the end of lever 30a for sliding engagement with cam portions 081a, 082a, as described before in connection with portions 081, 082 of the first embodiment.

The adjusting device essentially comprises a T-shaped groove 0110a formed in the plate along its radius and an intermediate part 68 sliding in this groove and fixed through a center pin 72, to a yoke 18a to which the end of the connecting rod 21a is attached.

The plate 01a is preferably provided with a portion 011a of greater thickness in which the T-shaped groove 0110a is formed.

Furthermore, the plate 01a is provided with a second portion 012a of greater thickness on which bears the head 631 of a screw 63, the latter co-operating with the intermediate part 68 for urging the latter as well as the connecting rod 21a into the position required by the machine.

For this purpose, the intermediate part 68 is traversed by a longitudinal bore into which passes the screw 63 the head of which is kept in position by means of a washer 64 and a split pin 65. The washer 64 bears on the second face of the shoulder piece 012a of the plate 01a, the first face receiving a part 632 of the screw head 631. By maneuvering the screw head, the displacement of the intermediate part 68 and hence that of the connecting rod 21a, is obtained.

The yoke 18a of said connecting rod 21a is preferably mounted to rotate freely on the pin 72 of the intermediate part 68 by means such as a nut 66 and a washer 67.

The jack 02a, the displacement of the piston of which causes the oscillation of the distributor plate 01a, preferably comprises a braking device acting on the piston 022a when the latter reaches the ends of its strokes, i.e., at each of its extreme positions within the casing of the jack 02a.

Figure 13:
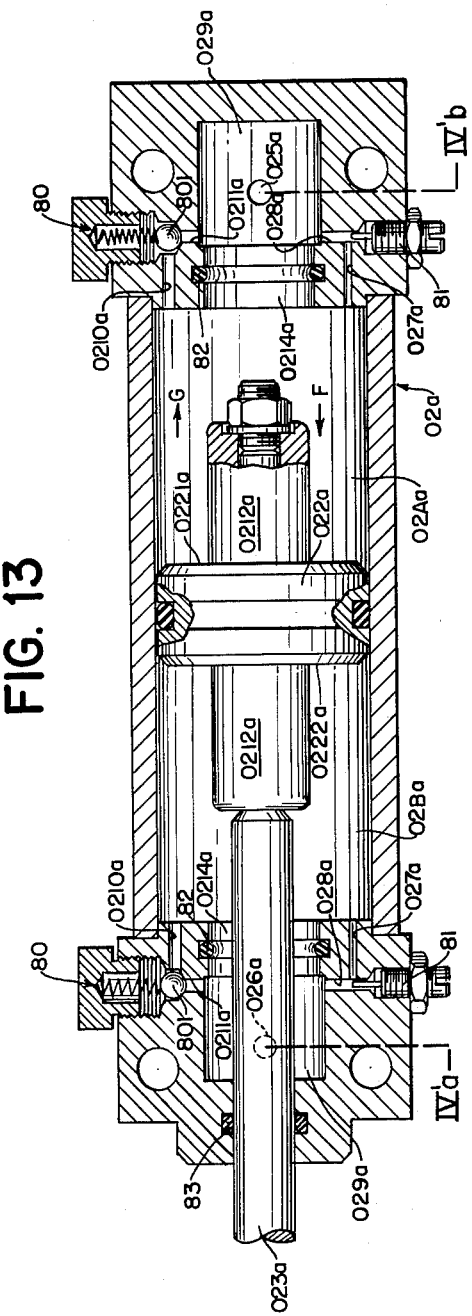
FIG. 13 is a sectional view of the jack controlling the distributor device of FIG. 12 and comprising a braking device.
Figure 17:
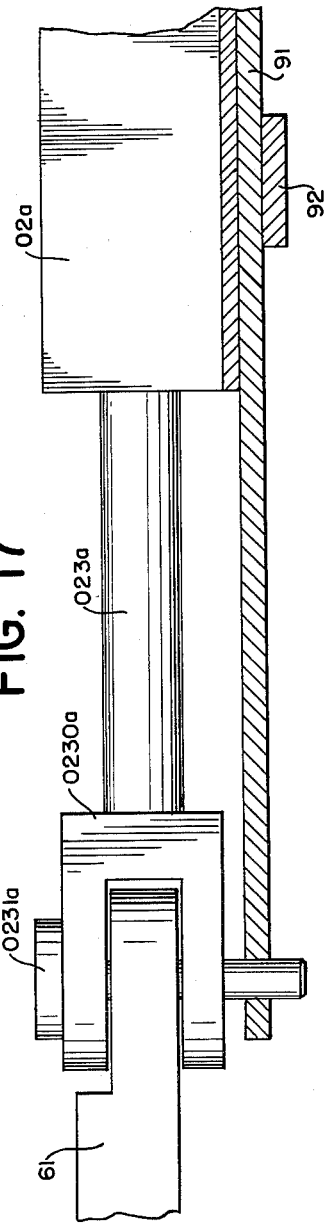
FIG. 17 is a partial sectional front view of the device controlling the electro-valve and the blower of the distributor of FIG. 12.

Each head of jack 02a is provided with a fluid intake 025a, 026a through which the fluid is alternately admitted and causes the displacement of the piston 022a according to the arrows "F" and "G," respectively, as shown in FIG. 13.

The piston 022a is provided on each of its faces 0221a and 0222a with two cylindrical parts 0212a.

Both heads of the jack 02a are provided with three bores: (a) a longitudinal bore 0214a connecting a chamber 029a into which opens the intake 025a (or 026a) of the fluid under pressure with a volume 02Aa (or 02Ba) limited by the casing of the jack 02a and the face 0221a (or 0222a) of the piston 022a; (b) a bore 0210a—0211a connecting a chamber 029a with the volume 02Aa (or 02Ba) on which bore is mounted a regulating device such as a valve 80; and (c) a bore 027a—028a connecting the chamber 029a to the volume 02Aa (or 02Ba), said bore being of a smaller section than the bore 0210a—0211a and controlled by a device such as a needle-screw 81 allowing the passage section to be varied for the fluid in the bore 027a—028a.

Finally, on each bore 0214a there is mounted a toric joint 82 sealing off the volume 02Aa (or 02Ba) from the chamber 029a when it co-operates with one of the cylindrical parts 0212a mounted on the rod 023a. Furthermore, the head of the jack 02a, across which the rod 023a of the piston 022a passes, is provided with another toric joint 83 ensuring a tight fit of the assembly while enabling the displacement of said rod 023a.

The braking device operates as follows: When the fluid under pressure is admitted through the opening 025a, the piston 022a moves in the direction of the arrow "F." As long as the cylindrical part 0212a has not entered the bore 0214a, the fluid from volume 02Ba escapes towards the opening 026a through the bore 0214a, thence to the chamber 029a, and to a much smaller extent through the bore 027a than through the bore 028a and the chamber 029a. At the same time, the fluid tending to escape through 0210a applies a ball 801 against its seat and closes the exhaust release bore 0211a.

When the cylindrical part 0212a enters the bore 0214a and co-operates with the toric joint 82, closing said bore 0214a, the fluid can only escape from the volume 02Ba through the bore 027a, the piston 022a being acted upon by the fluid pressing on its face 0221a is braked by the fluid unable to escape quickly from the volume 02Ba. This braking effect persists until the face 0222a of the piston 022a bears against the inner wall of the head of the jack 02a.

In this position, after reversal of the admission of the fluid into the jack, the rapid disengaging of the piston 022a from the internal face of said jack 02a will result (arrow "G") by the passage of fluid through the bore 0210a.

The fluid arriving by way of 026a passes through 029a and flows away through (a) the bore 0211a, then raises a control member such as the ball 801 and, passing through 0210a acts on the face 0222a of the piston 022a; and (b) said fluid then passes through the bores 028a and 027a but the section of these bores being negligible as compared to the section of 0210a, the action of the fluid by this bore is also negligible.

The fluid arriving by 026a and 0210a thus acts on the piston face 0222a until the part 0212a adjacent to said face leaves the bore 0214a and frees the latter, the fluid then flowing across the large bore 0214a through the chamber 029a, so that the piston 022a then moves faster to the right (arrow "G") until the cylindrical part 0212a adjacent to face 0221a closes the bore 0214a of the right-hand head through which the volume 02Aa of the fluid is discharged through opening 025a. The preceding process is repeated and, after reversal of the intake of the fluid into the jack 02a, the cycle starts again.

As shown in FIG. 16, the distributing device is provided with means enabling the utilizing machine to be controlled. The control of the machine is effected by moving a clutch lever 11a of the machine under the action of a rod 104a of a jack 10a. According to the invention, the jack 10a is controlled by an electro-valve the operation of which depends on an electro-magnetic device. This device comprises an electrical power source 93, a coil 94 co-operating with a rod 55a of an electro-valve 54a, this rod acting as a plunger core, and a switch 90. The control of the switch 90 is effected by a cam 92 integral with a slide bar 91 the displacement of which depends on that of the rod 023a of the jack 02a. The switch 90 is connected in series with a switch 96 which is operated by a jack 97 connected to a fluid circuit I'b feeding the gripping means 43a. When the gripping means are fed, the switch 96 is open. When the gripping means are no longer fed, the piston of the jack 97 is pushed back by a spring and the switch 96 closes.

This arrangement prevents the valve 54a from being operated twice in a cycle of the distributor device, once on the outward movement, then again on the return movement, and is similar to a device 95 controlling a blower 49a, to be discussed somewhat later. To avoid blowing at each passage of the cam 92, the supply of pressure fluid is interrupted every other time by a valve block 04a.

When the switch 90 is closed, the coil 94 is energized and causes the rod 55a to move out of the valve 54a and to move the piston of said valve 54a to the left. When the switches 90 and 96 are closed, the fluid reaches the jack 10a, and the utilizing machine is clutched.

When on the contrary, the switch 90 is open, the rod 55a is no longer actuated, and the piston remains in its right-hand position; the fluid no longer acts on the piston of the jack 10a and the clutch lever 11a, being no longer acted upon, ensures the declutching of the machine.

The slide-bar 91 is preferably guided in a bore provided in the casing of the jack 02a. According to the form of embodiment shown in FIG. 17, the bore has the shape of a dovetail and the slide-bar 91 is fixed to the yoke 0230a provided at the head of the rod 023a of the jack 02a by means of a pin 0231a of said yoke 0230a.

At each displacement of the rod 023a there is a corresponding displacement of the slide-bar 91 and of the cam 92. This cam co-operates with the switch 90 at each displacement, and, owing to this, causes the coil 94 to be energized.

Figure 18:
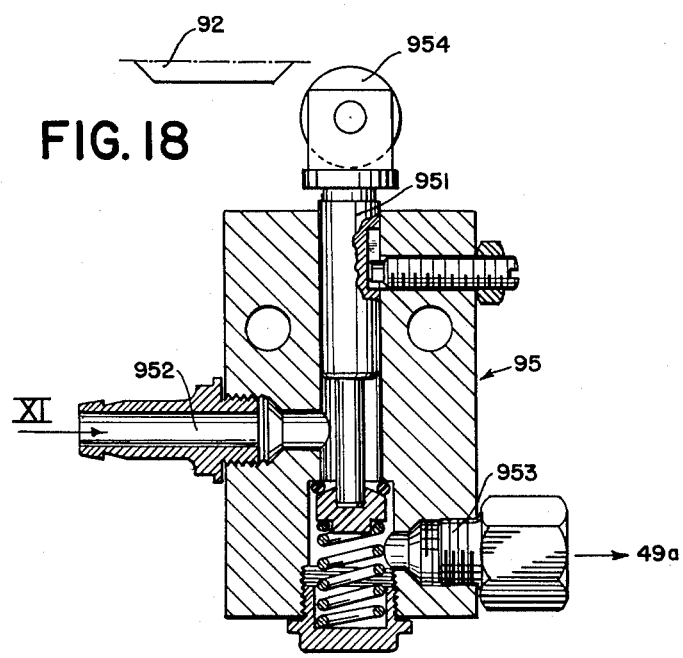
FIG. 18 is a frontal sectional view of an ejection blower of the distributor of FIG. 12.

Furthermore, as shown in FIG. 18, the cam 92 also controls the blower device 95 which distributes the fluid under pressure toward the device 49a for blowing and ejecting the workpieces.

The cam 92 co-operating with both the blower 95 and the switch 90 ensures at the same time: (a) the stoppage of the machine by declutching the same; and (b) the ejecting of the machined workpiece by blowing into the ejection device 49a.

The blower 95 is itself controlled by a distribution block 04a the working of which is similar to that of block 04 in FIG. 1 as described hereinabove. The distribution or valve block 04a comprises two bores 0410a and 0411a so arranged as to be in communication when a piston 042a is in its top position. One of these bores, 0410a, is connected by pipes III'b and III' to a general intake I' of fluid under pressure and the other bore 0411a to the blower 95 through XI.

When the piston 042a is in the top position, the fluid coming by way of I', III' and III'b leaves the distribution block 04a through 0411a and enters the blower 95. If, at this moment, a rod 951 of said blower 95 is lowered under the action of the cam 92 acting on a roller 954, the fluid flows from passage 952 to passage 953 and acts on the ejection device 49a. If the cam 92 does not act on the rod 951, the fluid cannot pass through the blower 95 and consequently cannot act on the ejection device 49a.

*Operation of the Distributor Device*

This operation is the same as that already described with reference to FIGS. 1 to 11, except for a few new elements described with the form of embodiment shown in FIGS. 12 to 18.

The fluid under pressure is admitted into the fluid circuit through an inlet 19a when a valve 14a is open. It is then admitted by I', I'a, III' and I'b into the following members of the distributor: a pilot valve 05a having upper and lower abutments 071a and 072a, respectively; the electro-valve 54a; the distribution block 04a; a valve 09a ensuring the opening and the closing of the gripping means 43a through the intermediary of a finger 092a moving between abutments 093a and 094a under the influence of one of the projecting members 061a and 062a attached to the distributor plate 01a in a manner similar to that described for the first embodiment.

The distribution block 04a controls, on the one hand, the admission of the fluid coming from III' and III'a to one or other piston face of the control jack 02a through IV'a or IV'b, and on the other hand, the admission of the fluid coming from III'b towards the blower 95 through XI. The top or the bottom position of the piston 042a of the distribution block 04a is itself controlled by the pilot valve 05a and a control unit 51a for admitting or stopping the passage of the fluid from the pilot valve 05a to the distribution block 04a. The unit 51a is actuable by means of a pedal 53a similar to pedal 53 of the first embodiment.

The displacement of the piston 022a of the jack 02a controls: (a) the oscillatory movement of the distributor plate 01a, i.e., the movements of the gripping means in both the horizontal and the vertical planes; and (b) the displacement of the slide 91, and hence the control of the clutching or declutching of the utilizing machine as well as the control of the blowing device.

The invention described above has also the advantage of making the operation of the utilizing machine dependent on the working of the distributor device, which enables the machine to be employed at full power, but only in the minimum lapse of time for moving the workpieces.

Furthermore, the second form of embodiment of the invention affords more particularly the following special advantages: (1) simple control of the movement of the distribution plate by a rack and pinion device; (2) simple control of the clutching jack of the utilizing machine by means of an electro-valve; and (3) adjustment of the stroke of the gripping means in the horizontal plane by the removable fixing of the connecting rod 21a on the distributor plate 01a.

It is obvious that the invention is not restricted to the examples of embodiments described and shown. If so required, recourse may be had to other methods and forms of embodiments without exceeding the scope of the invention. More particularly, the fluid under pressure could be compressed air or a liquid such as oil. In this latter case, the exhaust openings, more particularly of the pilot valve 05 or 05a, the distribution block 04 or 04a, the valve 12 would be connected to a circuit recovering the liquid and conveying the same, for example, into a tank from which it would be returned into the general circuit, more particularly by a conventional pumping device.

I claim:

1. A distributor device having a framework and adapted to be mounted by said framework on a utilizing machine for feeding individual workpieces thereto, comprising, in combination, a pivotable arm attached to said framework, gripping means carried by said arm for conveying said workpieces from a storage point to said machine, means for setting said machine into action when said gripping means are in a predetermined position, a disc rotatably mounted about a fulcrum solid with said framework, a pinion integral with said disc, a control jack having a piston provided with a rod solid with a rack meshing with said pinion, for imparting to said disc an oscillatory movement about said fulcrum, a telescopic connecting rod including resilient return means and crank-pins on both ends thereof, said crank-pins co-operating with said disc to oscillate said arm in a substantially horizontal plane, a pair of adjustable stops defining the extreme positions of said arm in said horizontal plane, cam means provided at the periphery of said disc, a lever acted upon by said cam means at one of its ends to bear by an adjustable screw provided at its other end on a mobile part carrying said arm to control the vertical displacements of said mobile part effected around a spindle carried by a basic part integral with said framework, a spring placed between said mobile part and said basic part for opposing the displacement of one toward the other and repelling said mobile part when the action of said screw ceases, fluid pressure means for operating said jack by means of a fluid, said jack being flanked on its longitudinal axis by two cylindrical parts co-operating with bores made in the respective heads of said jack for limiting the exhaust section offered to said fluid and consequently braking said piston at the end of its stroke, cam means on said arm, a fluid actuator forming part of said means for setting the machine into action and adapted to control the clutching and declutching of the machine, and a slide-valve actuated by said cam means and controlling the operation of said fluid actuator.

2. A distributor device having a framework and adapted to be mounted by said framework on a utilizing machine for feeding individual workpieces thereto, comprising, in combination, a pivotable arm attached to said framework, gripping means carried by said arm for conveying said workpieces from a storage point to said machine, means for setting said machine into action when said gripping means are in a predetermined position, a disc rotatably mounted about a fulcrum solid with said framework, a pinion integral with said disc, a control jack having a piston provided with a rod solid with a rack meshing with said pinion, for imparting to said disc an oscillatory movement about said fulcrum, a telescopic connecting rod including resilient return means and crank-pins on both ends thereof, said crank-pins co-operating with said disc to oscillate said arm in a substantially horizontal plane, a pair of adjustable stops defining the extreme positions of said arm in said horizontal plane, cam means provided at the periphery of said disc, a lever acted upon by said cam means at one of its ends to bear by an adjustable screw provided at its other end on a mobile part carrying said arm to control the vertical displacements of said mobile part effected around a spindle carried by a basic part integral with said framework, a spring placed between said mobile part and said basic part for opposing the displacement of one toward the other and repelling said mobile part when the action of said screw ceases, fluid pressure means for operating said jack by means of a fluid, said jack being flanked on its longitudinal axis by two cylindrical parts co-operating with bores made in the respective heads of said jack for limiting the exhaust section offered to said fluid and consequently braking said piston at the end of its stroke, a distribution block having a casing, two abutments integral with said disc, a pilot-valve fed by a general intake of said fluid, said jack having two oppositely arranged heads, two openings in said casing connected to two respective intake openings of said jack at each of said heads, two further openings in said casing being connected to said pilot-valve, at least one exhaust opening for discharging said fluid from said casing, and a slide-valve piston in said distribution block whose displacements are controlled by said pilot-valve, said distribution block controlling, in turn, the admission of said fluid alternately at each of said heads, the operation of said pilot-valve being caused substantially at the end of each stroke of said disc by said two abutments.

3. A distributor device having a framework and adapted to be mounted by said framework on a utilizing machine for feeding individual workpieces thereto, comprising, in combination, a pivotable arm attached to said framework, gripping means carried by said arm for conveying said workpieces from a storage point to said machine, means for setting said machine into action when said gripping means are in a predetermined position, a disc rotatably mounted about a fulcrum solid with said framework, a pinion integral with said disc, a control jack having a piston provided with a rod mounted at its free end on a pin integral with said disc, for imparting to said disc an oscillatory movement about said fulcrum, a telescopic connecting rod including resilient return means and crank-pins on both ends thereof, said crank-pins co-operating with said disc to oscillate said arm in a substantially horizontal plane, a pair of adjustable stops defining the extreme positions of said arm in said horizontal plane, cam means provided at the periphery of said disc, a lever acted upon by said cam means at one of its ends to bear by an adjustable screw provided at its other end on a mobile part carrying said arm to control the vertical displacements of said mobile part effected around a spindle carried by a basic part integral with said framework, a spring placed between said mobile part and said basic part for opposing the displacement of one toward the other and repelling said mobile part when the action of said screw ceases, fluid pressure means for operating said jack by means of a fluid, two abutments integral with said disc, a pilot valve fed by a general intake of said fluid, said jack having two oppositely arranged heads, a distribution block having a casing, two openings in said casing connected to two respective intake openings of said jack at each of said heads, two further openings in said casing being connected to said pilot-valve, at least one exhaust opening for discharging said fluid from said casing, and a slide-valve piston in said distribution block whose displacements are controlled by said pilot-valve, said distribution block controlling, in turn, the admission of said fluid alternately at each of said heads, the operation of said pilot-valve being caused substantially at the end of each stroke of said disc by said two abutments.

4. A distributor device as set forth in claim 3, further comprising cam means on said arm, wherein said means for setting said machine into action comprises a fluid actuator controlling the clutching and declutching of said machine, said actuator being controlled by a slide-valve actuated by said cam means.

References Cited in the file of this patent

UNITED STATES PATENTS

| | | |
|---|---|---|
| 856,709 | Lang | June 11, 1907 |
| 1,451,547 | Kintzele | Apr. 10, 1923 |
| 1,458,456 | Young | June 12, 1923 |
| 1,766,573 | Westin | June 24, 1930 |
| 1,771,641 | Lamb | July 29, 1930 |
| 2,380,084 | Strauss | July 10, 1945 |
| 2,541,574 | Crooks | Feb. 13, 1951 |
| 2,719,510 | Elder | Oct. 4, 1955 |
| 2,811,267 | Bock | Oct. 29, 1957 |
| 2,853,974 | Hewitt | Sept. 30, 1958 |
| 2,862,600 | Burrows | Dec. 2, 1958 |
| 2,876,646 | Nickson | Mar. 10, 1959 |

FOREIGN PATENTS

| | | |
|---|---|---|
| 206,120 | Australia | Feb. 7, 1959 |